(12) United States Patent
Luo et al.

(10) Patent No.: US 11,832,235 B2
(45) Date of Patent: Nov. 28, 2023

(54) MULTI-LINK NETWORK COORDINATION

(71) Applicant: QUALCOMM Incorporated, San Diego, CA (US)

(72) Inventors: Jianghong Luo, Skillman, NJ (US); Navid Abedini, Basking Ridge, NJ (US); Tao Luo, San Diego, CA (US); Muhammad Nazmul Islam, Littleton, MA (US); Junyi Li, Fairless Hills, PA (US); Karl Georg Hampel, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/648,078

(22) Filed: Jan. 14, 2022

(65) Prior Publication Data
US 2022/0141835 A1   May 5, 2022

Related U.S. Application Data

(62) Division of application No. 16/534,432, filed on Aug. 7, 2019, now Pat. No. 11,229,038.
(Continued)

(51) Int. Cl.
*H04W 72/121* (2023.01)
*H04W 72/52* (2023.01)

(52) U.S. Cl.
CPC ......... *H04W 72/121* (2013.01); *H04W 72/52* (2023.01)

(58) Field of Classification Search
CPC ............................ H04W 72/121; H04W 72/52
See application file for complete search history.

(56) References Cited

U.S. PATENT DOCUMENTS

| 2004/0122966 A1 | 6/2004 | Hum et al. |
| 2006/0182065 A1 | 8/2006 | Petrovic et al. |

(Continued)

FOREIGN PATENT DOCUMENTS

| WO | 02067594 A2 | 8/2002 |
| WO | 2018103837 A1 | 6/2018 |

OTHER PUBLICATIONS

European Search Report—EP21209230—Search Authority—The Hague—dated Dec. 7, 2021.
(Continued)

*Primary Examiner* — Duc C Ho
(74) *Attorney, Agent, or Firm* — Harrity & Harrity, LLP/Qualcomm Incorporated

(57) ABSTRACT

Various aspects of the present disclosure generally relate to wireless communication. In some aspects, a central entity may determine a set of schedulable resources for a plurality of links associated with a plurality of nodes of a multi-link network; and may provide scheduling information to the plurality of nodes to schedule communication on the plurality of links based at least in part on determining the set of schedulable resources. In some aspects, a node of a network may determine an extended slot format indicator for the node based at least in part on a received extended slot format indicator of a parent node of the node and a received null adjust request from a child node of the node; may provide the determined extended slot format indicator to the child node; and may provide the received null adjust request to the parent node. Numerous other aspects are provided.

29 Claims, 11 Drawing Sheets

Related U.S. Application Data

(60) Provisional application No. 62/716,875, filed on Aug. 9, 2018.

(56) References Cited

U.S. PATENT DOCUMENTS

| | | | |
|---|---|---|---|
| 2007/0211757 A1 | 9/2007 | Oyman | |
| 2014/0204893 A1* | 7/2014 | Horiuchi | H04L 5/0055 370/329 |
| 2016/0112992 A1 | 4/2016 | Bhushan et al. | |
| 2018/0124479 A1 | 5/2018 | Taylor et al. | |
| 2018/0242319 A1* | 8/2018 | Akkarakaran | H04L 5/0053 |
| 2018/0270679 A1 | 9/2018 | Laselva et al. | |
| 2018/0338320 A1 | 11/2018 | Fodor et al. | |
| 2019/0021108 A1* | 1/2019 | Hampel | H04W 72/53 |
| 2019/0289500 A1 | 9/2019 | Abedini et al. | |
| 2019/0373627 A1* | 12/2019 | Luo | H04W 72/54 |
| 2019/0393980 A1 | 12/2019 | Lin et al. | |
| 2020/0007223 A1* | 1/2020 | Zhu | H04W 16/26 |
| 2020/0053745 A1 | 2/2020 | Luo et al. | |
| 2022/0141836 A1 | 5/2022 | Luo et al. | |

OTHER PUBLICATIONS

Huawei et al., "Physical Layer Enhancement Consideration on IAB",, 3GPP Draft, 3GPP TSG RAN WG 1 Meeting #93, R1-1805925, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441144, 8 Pages, Retrieved from the Internet: URL: http://www.3gpp.org/ftp/Meetings%5F3GPP%5FSYNC/RAN1/Docs/ [retrieved on May 20, 2018], Section 2.2.

International Search Report and Written Opinion—PCT/US2019/045763—ISA/EPO—dated Jan. 7, 2020.

Nokia Siemens Networks et al., "Views on Inter-band CA with different TDD Configurations on different Bands", 3GPP Draft; R1-114309, 3rd Generation Partnership Project (3GPP), Mobile Competence Centre, 650, Route Des Lucioles, F-06921 Sophia-Antipolis Cedex, France, vol. RAN WG1, No. San Francisco, USA; Nov. 14, 2011-Nov. 18, 2011, Nov. 8, 2011, XP050562182, [retrieved on Nov. 8, 2011], 4.2 Cross carrier scheduling, 7 pages.

Partial International Search Report—PCT/US2019/045763—ISA/EPO—dated Nov. 14, 2019.

Qualcomm Incorporated: "Contents of Group Common Pdcch", 3GPP Draft; R1- 1711247 Contents of Group Common PDCCH, 3rd Generation Partnership Project (3GPP), Mobile Competence Centre, 650, Route Des Lucioles, F-06921 Sophia-Antipolis Cedex, France, vol. RAN WG1, No. Qingdao, P.R. China; Jun. 27, 2017-Jun. 30, 2017 Jun. 26, 2017, XP051300445, Retrieved from the Internet: URL:http://www.3gpp.org/ftp/Meetings_3GPP_SYNC/RAN1/Docs/ [retrieved on Jun. 26, 2017],2 SFI contents, 6 pages.

Qualcomm Incorporated: "Enhancements to Support NR Backhaul Links", 3GPP Draft, 3GPP TSG RAN WG1 Meeting #93, R1-1807393, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, 16 Pages, May 12, 2018, XP051463084, Retrieved from the Internet: URL: http://www.3gpp.org/ftp/tsg%5Fran/WG1%5FRL1/TSGR1%5F93/Docs [retrieved on May 12, 2018].

Qualcomm Incorporated: "Enhancements to Support NR Backhaul links", 3GPP Draft, R1-1809442, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 20, 2018-Aug. 24, 2018 Aug. 17, 2018, XP051516807, Retrieved from the Internet: URL:http://www.3gpp.org/ftp/tsg%5Fran/WG1%5FRL1/TSGR1%5F94/Docs/R1%2D1809442%2Ezip [retrieved on Aug. 17, 2018], 19 pages.

Qualcomm Incorporated: "Enhancements to Support NR Backhaul Links", 3GPP TSG RAN WG1 Meeting #94b, R1-1811256, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Oct. 12, 2018 (Oct. 12, 2018), 22 Pages, XP051518659, Retrieved from the Internet: URL: http://www.3gpp.org/ftp/tsg%5Fran/WG1%5FRL1/TSGR1%5F94b/Docs/R1%2D1811256%2Ezip [retrieved on Sep. 29, 2018] the whole document, figures 1-9, tables 1-6, sections 1-3, section 2.6.

ZTE: "Discussion on IAB Node Resource Allocation", 3GPP Draft, 3GPP TSG-RAN WG2 NR AdHoc 1807, R2-1810215, Discussion on IAB Node Resource Allocation, 3rd Generation Partnership Project (3GPP), Mobile Competence Centre, 650, Route Des Lucioles, F-06921 Sophia-Antipolis Cedex, France, vol. RAN WG2, No. Montreal, Canada, Jul. 2, 2018-Jul. 6, 2018, Jul. 1, 2018 (Jul. 1, 2018), XP051467408, 4 Pages, Retrieved from the Internet: URL: http://www.3gpp.org/ftp/Meetings%5F3GPP%5FSYNC/RAN2/Docs. retrieved on Jul. 1, 2018]2 Discussion 2.2 Frame structure configuration.

Taiwan Search Report—TW108128236—TIPO—dated Jan. 11, 2023.

\* cited by examiner

MULTI-LINK NETWORK COORDINATION

CROSS-REFERENCE TO RELATED APPLICATIONS UNDER 35 U.S.C. § 119

This application is a divisional of U.S. patent application Ser. No. 16/534,432, filed Aug. 7, 2019, entitled "MULTI-LINK NETWORK COORDINATION," (now U.S. Pat. No. 11,229,038), which claims priority to U.S. Provisional Patent Application No. 62/716,875, filed on Aug. 9, 2018, entitled "MULTI-LINK NETWORK COORDINATION," the contents of which are incorporated herein by reference in their entireties.

TECHNICAL FIELD OF THE DISCLOSURE

Aspects of the technology described below generally relate to wireless communication, and more particularly to techniques and apparatuses for multi-link network coordination. Some techniques and apparatuses described herein enable and provide wireless communication devices and systems configured for multi-link or multi-hop scenarios and efficient communication therein.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication, performed by a central entity, may include determining a set of schedulable resources for a plurality of links associated with a plurality of nodes of a multi-link network, wherein at least one node, of the plurality of nodes, is not a parent node or a child node of the central entity. The method may include providing scheduling information to the plurality of nodes to schedule communication on the plurality of links based at least in part on determining the set of schedulable resources.

In some aspects, a central entity for wireless communication may include memory and one or more processors operatively coupled to the memory. The memory and the one or more processors may be configured to determine a set of schedulable resources for a plurality of links associated with a plurality of nodes of a multi-link network, wherein at least one node, of the plurality of nodes, is not a parent node or a child node of the central entity. The memory and the one or more processors may be configured to provide scheduling information to the plurality of nodes to schedule communication on the plurality of links based at least in part on determining the set of schedulable resources.

In some aspects, a non-transitory computer-readable medium may store one or more instructions for wireless communication. The one or more instructions, when executed by one or more processors of a central entity, may cause the one or more processors to determine a set of schedulable resources for a plurality of links associated with a plurality of nodes of a multi-link network, wherein at least one node, of the plurality of nodes, is not a parent node or a child node of the central entity. The one or more instructions, when executed by the one or more processors of the central entity, may cause the one or more processors to provide scheduling information to the plurality of nodes to schedule communication on the plurality of links based at least in part on determining the set of schedulable resources.

In some aspects, an apparatus for wireless communication may include means for determining a set of schedulable resources for a plurality of links associated with a plurality of nodes of a multi-link network, wherein at least one node, of the plurality of nodes, is not a parent node or a child node of the apparatus. The apparatus may include means for providing scheduling information to the plurality of nodes to schedule communication on the plurality of links based at least in part on determining the set of schedulable resources.

In some aspects, a method of wireless communication, performed by a node, may include determining an extended slot format indicator for the node based at least in part on a received extended slot format indicator of a parent node of the node and a received null adjust request from a child node of the node, wherein the extended slot format indicator for the node includes a null field identifying a non-schedulable resource of the node. The method may include providing the determined extended slot format indicator to the child node of the node. The method may include providing the received null adjust request to the parent node of the node.

In some aspects, a node for wireless communication may include memory and one or more processors operatively coupled to the memory. The memory and the one or more processors may be configured to determine an extended slot format indicator for the node based at least in part on a received extended slot format indicator of a parent node of the node and a received null adjust request from a child node of the node, wherein the extended slot format indicator for the node includes a null field identifying a non-schedulable resource of the node. The memory and the one or more processors may be configured to provide the determined extended slot format indicator to the child node of the node. The memory and the one or more processors may be configured to provide the received null adjust request to the parent node of the node.

In some aspects, a non-transitory computer-readable medium may store one or more instructions for wireless communication. The one or more instructions, when executed by one or more processors of a node, may cause the one or more processors to determine an extended slot format indicator for the node based at least in part on a received extended slot format indicator of a parent node of the node and a received null adjust request from a child node of the node, wherein the extended slot format indicator for the node includes a null field identifying a non-schedulable resource of the node. The one or more instructions, when executed by the one or more processors of the node, may cause the one or more processors to provide the determined extended slot format indicator to the child node of the node. The one or more instructions, when executed by the one or more processors of the node, may cause the one or more processors to provide the received null adjust request to the parent node of the node.

In some aspects, an apparatus for wireless communication may include means for determining an extended slot format indicator for the apparatus based at least in part on a received extended slot format indicator of a parent node of the apparatus and a received null adjust request from a child node of the apparatus, wherein the extended slot format indicator for the apparatus includes a null field identifying a non-schedulable resource of the apparatus. The apparatus may include means for providing the determined extended slot format indicator to the child node of the apparatus. The apparatus may include means for providing the received null adjust request to the parent node of the apparatus.

Aspects generally include a method, device, apparatus, computer program product, non-transitory computer-readable medium, user equipment, base station, wireless communication device, node, central entity, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
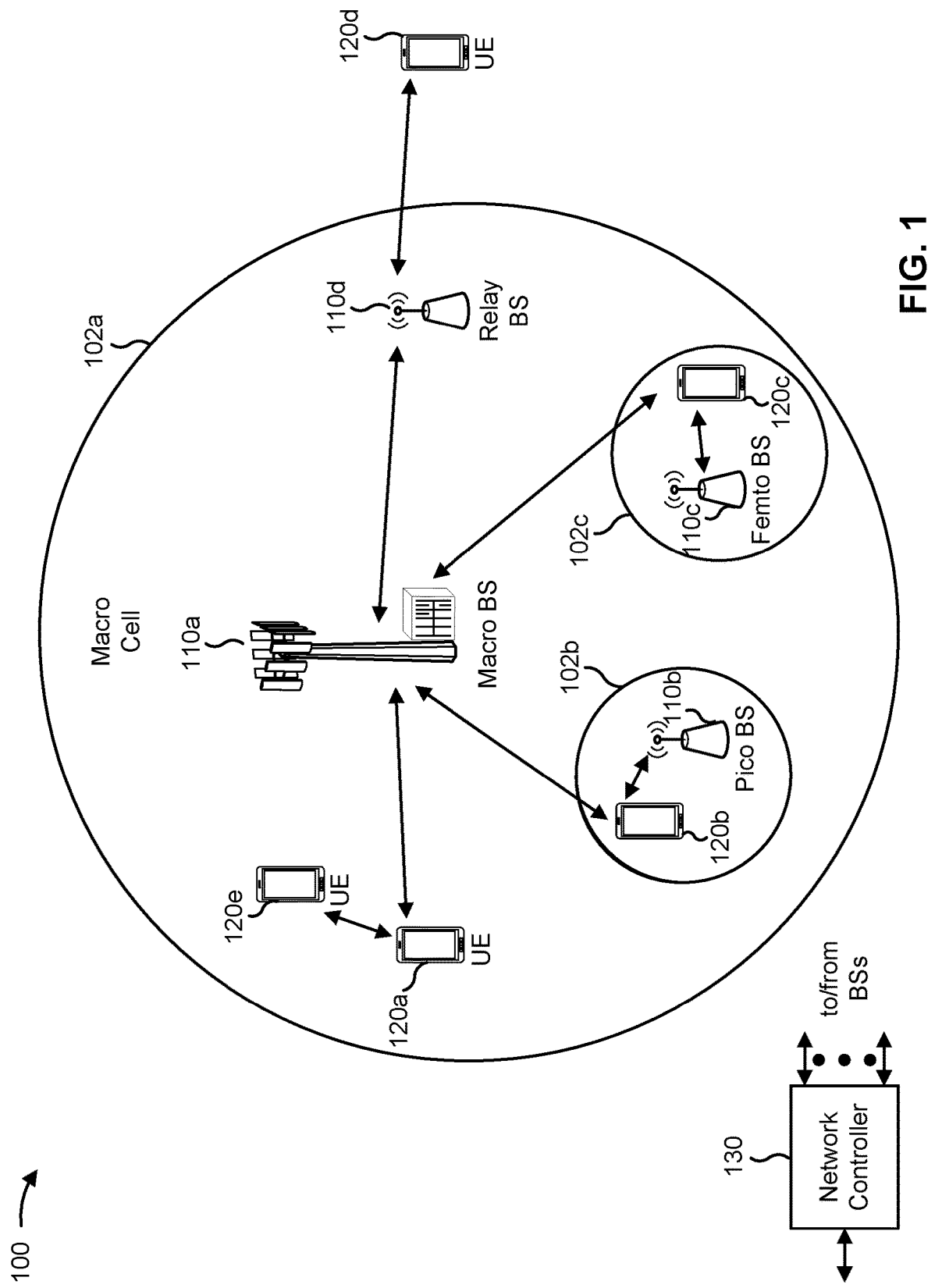
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
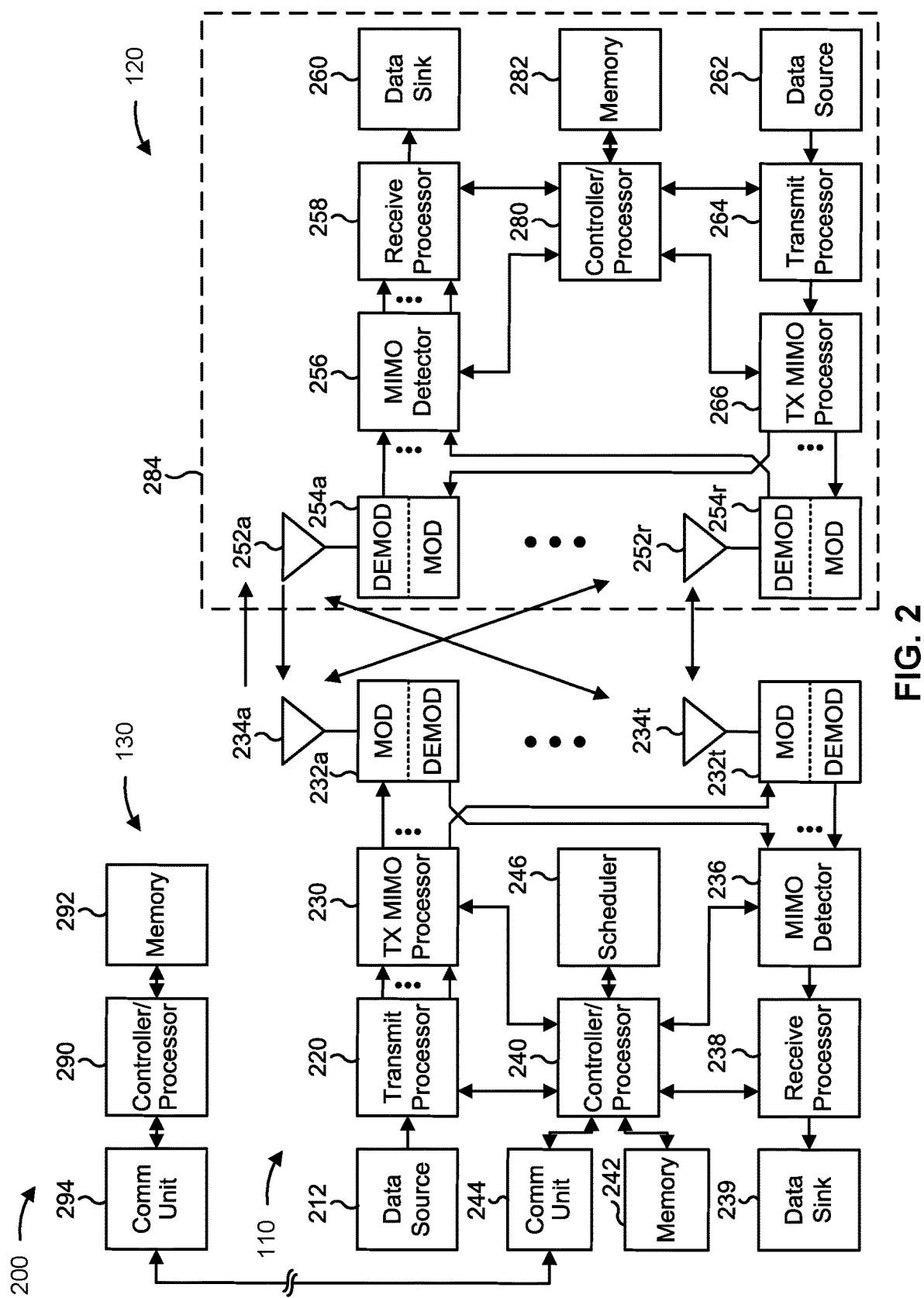
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with multi-link network coordination, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, a central entity (e.g., base station 110, UE 120, and/or the like) may include means for determining a set of schedulable resources for a plurality of links associated with a plurality of nodes of a multi-link network (e.g., using controller/processor 240, controller processor 280, and/or the like), means for providing scheduling information to the plurality of nodes to schedule communication on the plurality of links based at least in part on determining the set of schedulable resources (e.g., using controller/processor 240, transmit process 220, TX MIMO processor 230, modulator 232, antenna 234, controller/processor 280, transmit processor 264, TX MIMO processor 266, modulator 254, antenna 252, and/or the like), and/or the like. In some aspects, such means may include one or more components of base station 110, UE 120, and/or the like described in connection with FIG. 2.

In some aspects, a node (e.g., base station 110, UE 120, and/or the like) may include means for determining an extended slot format indicator for the node based at least in part on a received extended slot format indicator of a parent node of the node and a received null adjust request from a child node of the node (e.g., using controller/processor 240, controller processor 280, and/or the like_), means for providing the determined extended slot format indicator to the child node of the node (e.g., using controller/processor 240, transmit process 220, TX MIMO processor 230, modulator 232, antenna 234, controller/processor 280, transmit processor 264, TX MIMO processor 266, modulator 254, antenna 252, and/or the like), means for providing the received null adjust request to the parent node of the node (e.g., using controller/processor 240, transmit process 220, TX MIMO processor 230, modulator 232, antenna 234, controller/processor 280, transmit processor 264, TX MIMO processor 266, modulator 254, antenna 252, and/or the like), and/or the like. In some aspects, such means may include one or more components of base station 110, UE 120, and/or the like described in connection with FIG. 2.

As indicated above, FIG. 2 is provided merely as an example. Other examples may differ from what is described with regard to FIG. 2.

Figure 3A:
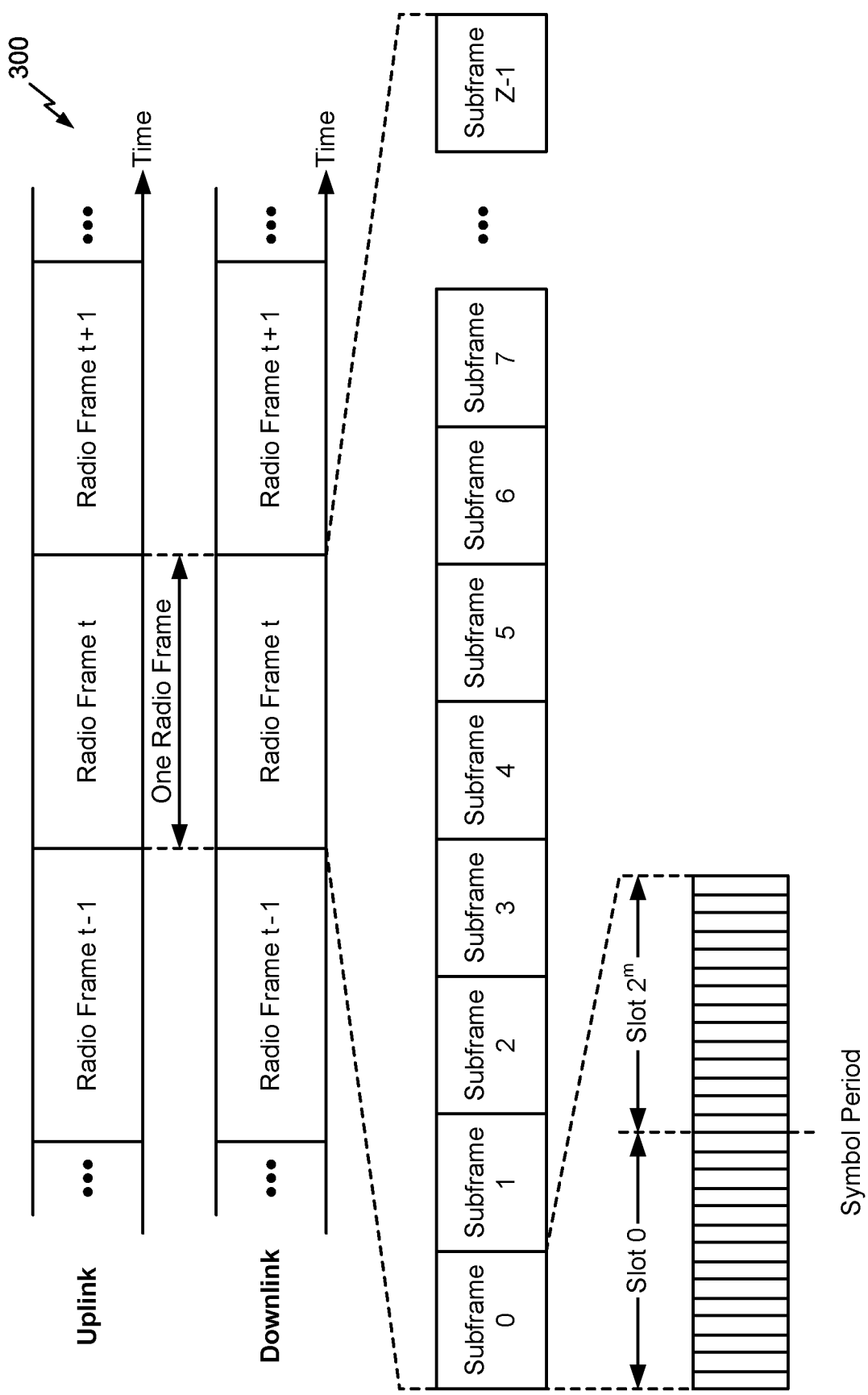
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
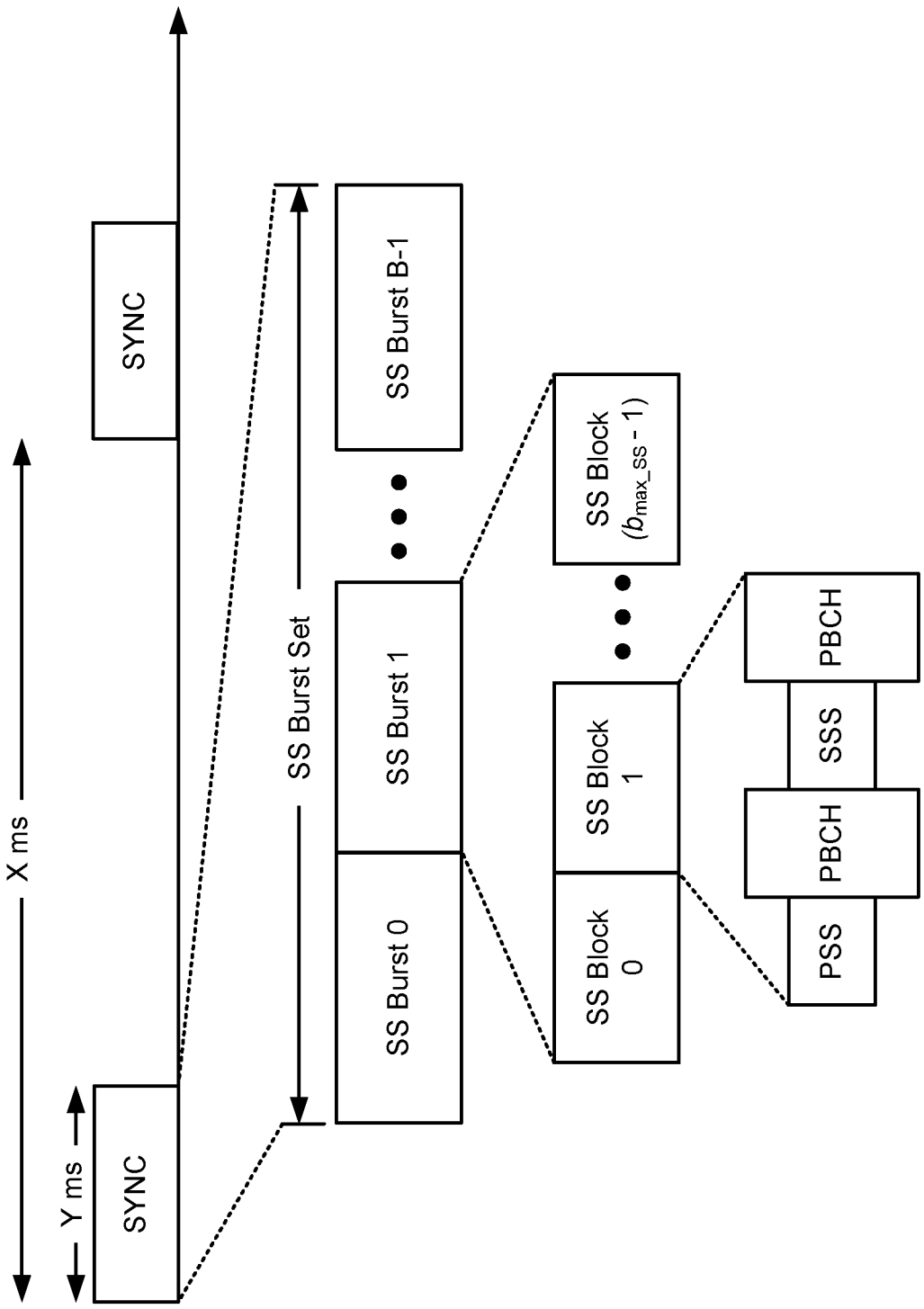
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4A:
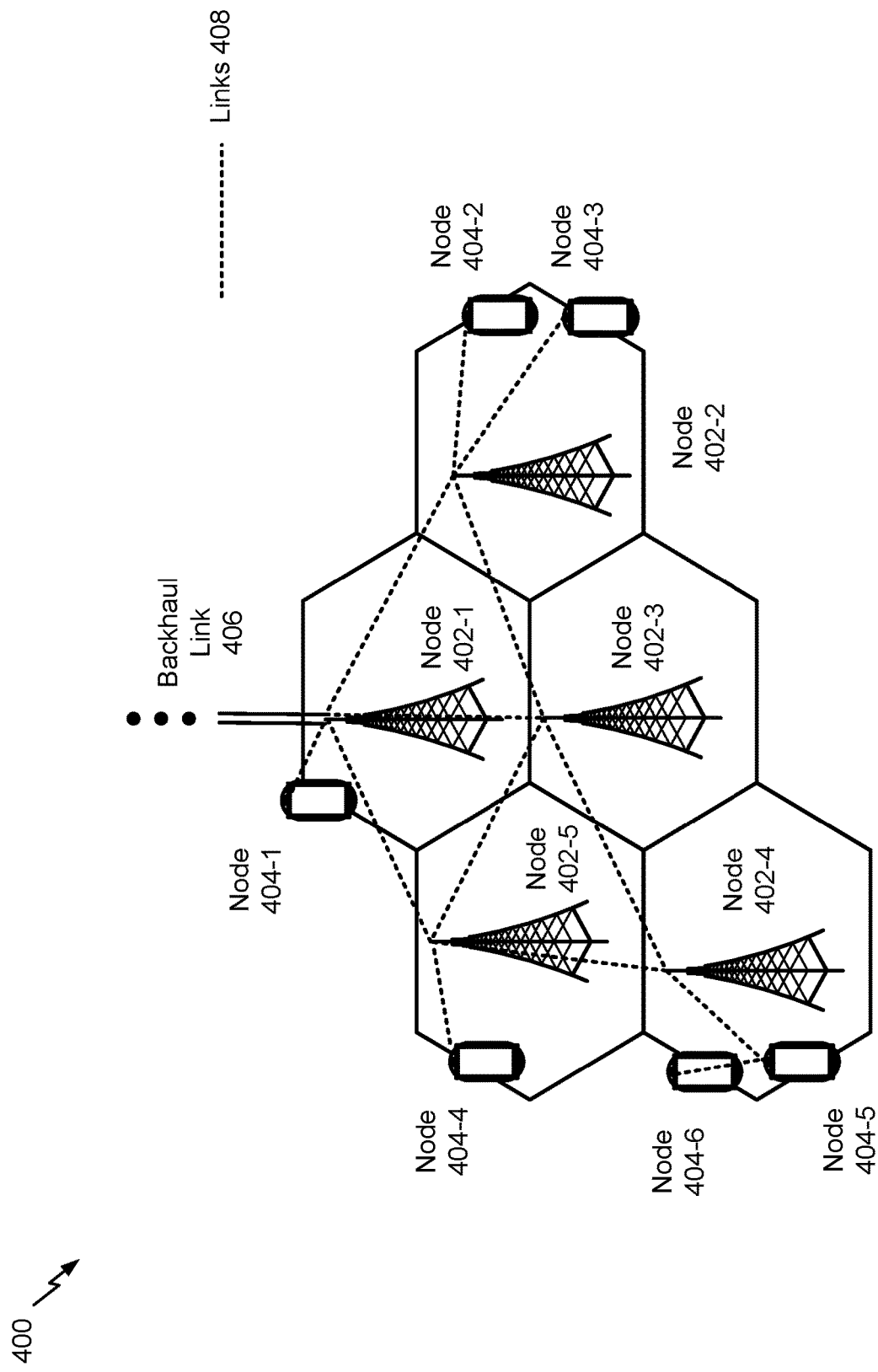
FIGS. 4A-4C are diagrams illustrating an example of a network topology for a network, in accordance with various aspects of the present disclosure.
Figure 4B:
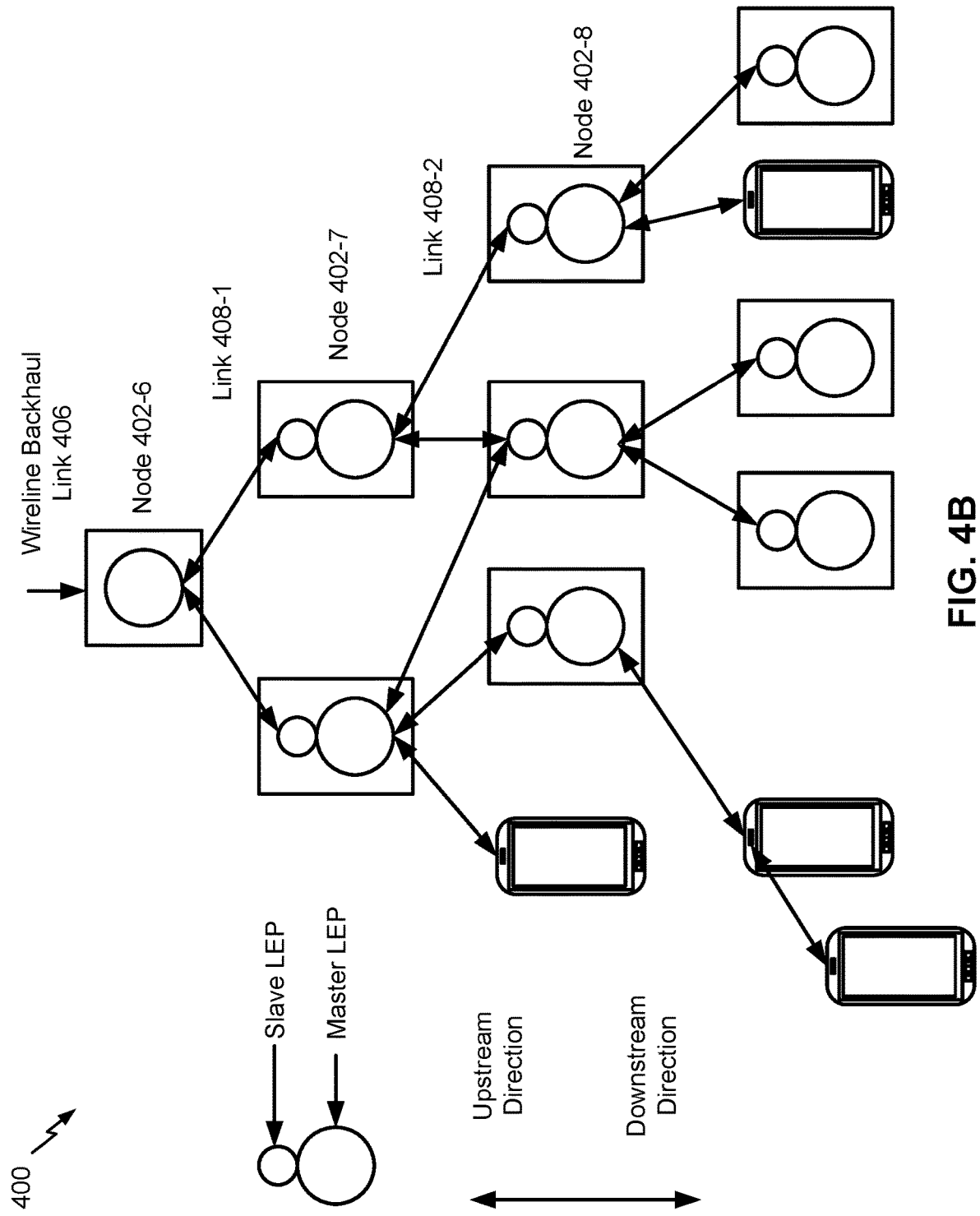
Figure 4C:
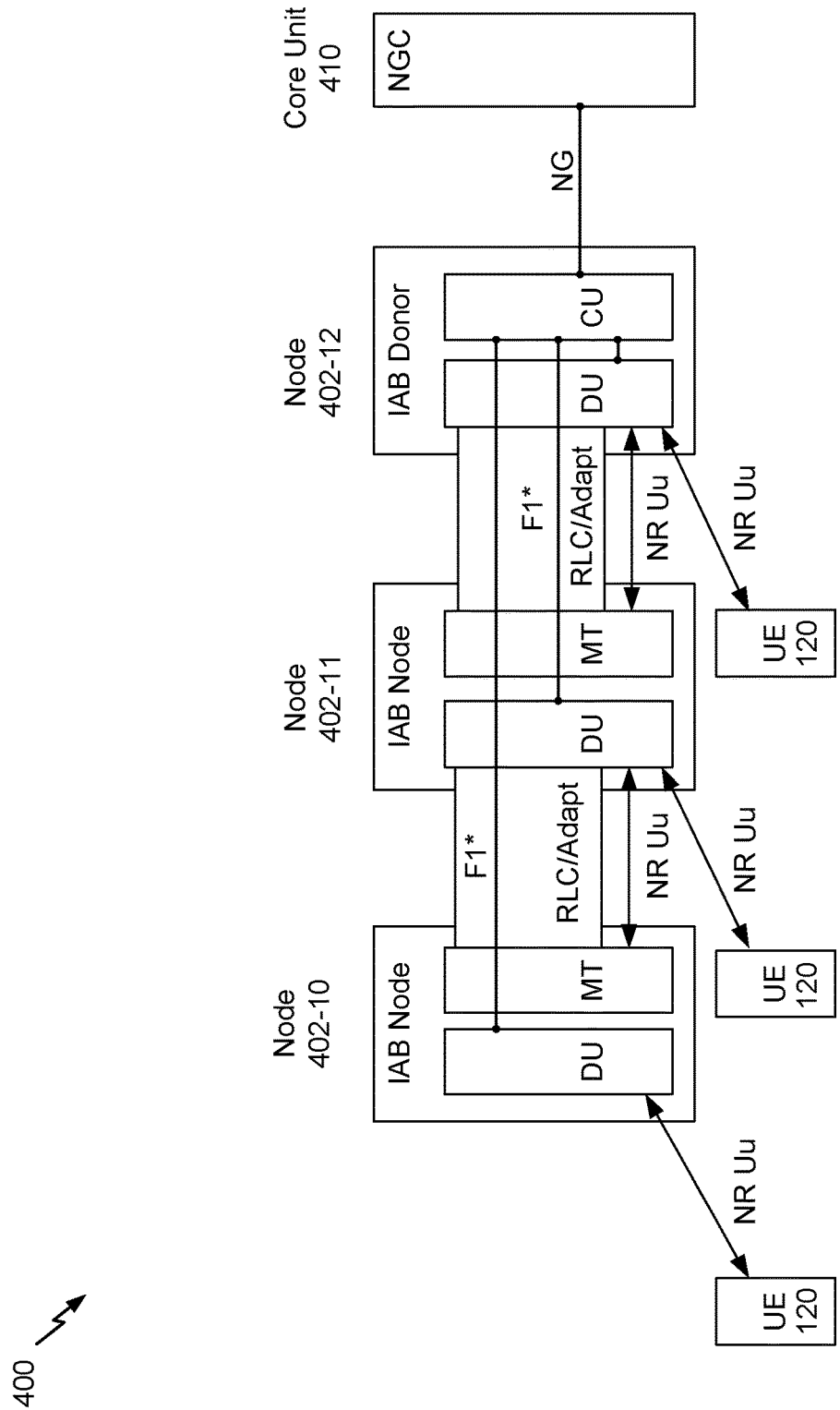

FIGS. 4A-4C are diagrams illustrating an example 400 of a network topology for a multi-link network, in accordance with various aspects of the present disclosure. Self-backhauling or integrated access/backhaul (IAB) may be deployed to use a common set of resources for access traffic and backhaul traffic. For example, a first node (e.g., a BS 110, a UE 120, and/or the like) may communicate backhaul traffic via first mmWave resources with a second node, and may communicate access traffic via second mmWave resources with a third node. In some aspects, the second node and the third node may be the same node. For example, the first node may communicate traffic via first mmWave resources and second mmWave resources. Although some aspects, described herein, are described in terms of an IAB deployment, some aspects described herein may be used in connection with other types of multi-hop networks.

As shown in FIG. 4A, example 400 may include multiple nodes 402 (e.g., BSs) and multiple nodes 404 (e.g., UEs). At least one node (e.g., node 402-1) may communicate with a core network via a backhaul link 406, such as a fiber connection, a wireless backhaul connection, and/or the like. Nodes 402 and 404 may communicate with each other using a set of links 408, such as a set of mmWave links; a 3G, 4G, 5G, etc. air interface; and/or the like. In some aspects, a node 402 may correspond to BS 110 or UE 120 shown in FIG. 1. Similarly, a node 404 may correspond to BS 110 or a UE 120 shown in FIG. 1.

As further shown in FIG. 4A, one or more nodes 402 or 404 may communicate indirectly via one or more other nodes 402 or 404. For example, data may be transferred from a core network to node 404-6 via backhaul link 406, a link 408 between node 402-1 and node 402-5, a link 408 between node 402-5 and node 402-4, a link 408 between node 402-4 and node 404-5, and a link 408 between node 404-5 and node 404-6. In some aspects, multiple different paths may be used to communicate data between nodes 402 or 404. For example, node 402-5 may communicate with node 402-4 via a single link 408 between node 402-5 and node 402-4 (e.g., a direct link) and/or via a first link 408 between node 402-5 and node 402-3 and a second link between node 402-3 and node 402-4 (e.g., an indirect link).

As shown in FIG. 4B, nodes 402 and nodes 404 can be arranged in a hierarchical topology to enable management of network resources. Each link 408 may be associated with a master link end point (master LEP) and a slave link end point (slave LEP), which may define a hierarchy between nodes 402 or 404. For example, node 402-6 may communicate with node 402-7 via link 408-1. In this case, node 402-6 is associated with a master link end point and node 402-7 is associated with a slave link end point for link 408-1, which may define node 402-6 as hierarchically superior to node 402-7, and node 402-7 as hierarchically inferior to node 402-6 with regard to link 408-1. In this case, node 402-6 may be termed a master node or a parent node and node 402-7 may be termed a slave node or a child node. Moreover, node 402-6 may be defined as upstream relative to node 402-7 (and node 402-7 may be defined as downstream relative to node 402-6).

Similarly, node 402-7 includes a master link end point for link 408-2 and node 402-8 includes a slave link end point for link 408-2. In this case, node 402-7 is hierarchically superior and upstream to node 402-8, and node 402-8 is hierarchically inferior and downstream to node 402-7 with regard to link 408-2. In this case, node 402-7 may be termed the master node or the parent node and node 402-8 may be termed the slave node or the child node.

As shown in FIG. 4C, a set of interfaces may be illustrated for a set of nodes 402 in a hierarchical topology. In this case, node 402-10 (e.g., a first IAB node) may be hierarchically inferior to node 402-11 (e.g., a second IAB node), and may be hierarchically inferior to node 402-12 (e.g., an IAB donor). Similarly, node 402-11 may be hierarchically inferior to node 402-12.

In some aspects, an IAB node may be a node that relays traffic to or from an anchor through one or more hops (e.g., one or more other nodes). In some aspects, an IAB donor may be a node that is associated with a wireline connection to a core network. For example, node 402-12 may include a central unit (CU) that includes an NG interface connecting the CU to a core unit 410 (e.g., a Next Gen core (NGC) unit), which may be a node of the core network.

In some aspects, node 402-12 may communicate with nodes 402-10 and 402-11 via another interface. For example, the CU of node 402-12 may include F1 interfaces to respective distributed units (DUs) of nodes 402-10 and 402-11. Additionally, or alternatively, a DU of node 402-12 (e.g., which may be a master link end point) may include an NR Uu interface to an MT (e.g., which may be a slave link end point for the NR Uu interface) of node 402-11 and a radio link control adapt-type channel (RLC/adapt) interface to the MT of node 402-11. Additionally, or alternatively, the DU of node 402-12 may include one or more other interfaces, such as an NR Uu interface to a UE 120 (e.g., a node 404), and/or the like.

In some aspects, node 402-11 may communicate using one or more other interfaces. For example, a DU of node 402-11 may include an NR Uu interface to an MT of node 402-10, an RLC/adapt interface to the MT of node 402-11, an NR Uu interface to a UE 120, and/or the like. In some aspects, node 402-10 may include one or more other interfaces, such as an NR Uu interface to a UE 120.

In some aspects, the CU, the DUs, and the MTs may be associated with a subset of functions for the nodes 402. For example, the CU of node 402-12 may be associated with communicating with a core network, and may operate in connection with a radio resource control (RRC) layer, a packet data control protocol (PDCP) layer, and/or the like. Additionally, or alternatively, the DUs may be scheduling nodes for corresponding MTs, which may be child nodes. In other words, DUs may represent master link end points for corresponding MTs, which may represent slave link end points. In some aspects, DUs and MTs may be associated with communicating scheduling information in connection with a radio link control (RLC) layer, a media access control (MAC) layer, a physical (PHY) layer, and/or the like.

As indicated above, FIGS. 4A-4C are provided as examples. Other examples may differ from what is described with regard to FIGS. 4A-4C.

In some communications systems, such as 5G or NR, a multi-link network or multi-hop network may be deployed to enable communication between wireless nodes of the network. A policy, such as a half-duplex constraint, may be enforced for nodes of a network, such as a parent node, a node, and a child node arranged hierarchically. However, an MT of the node may receive scheduling from the parent node indicating transmission via a link, and a DU of the node may provide scheduling to the child node indicating reception on another link, which may violate the half-duplex constraint. Moreover, a lack of flexibility in scheduling in a multi-link network may result in inefficient use of network resources. Some aspects described herein enable multi-link resource coordination. For example, a central entity may be deployed to enforce centralized resource partitioning by providing scheduling information identifying a set of schedulable resources determined based at least in part on feedback information (e.g., a resource utilization report). Similarly, a node may be configured to provide an extended slot format indicator (SFI) based at least in part on a received extended SFI and received uplink feedback to achieve dynamic resource coordination. In this way, a multi-link network may achieve improved latency, improved reliability, improved scheduling flexibility, and/or the like relative to other techniques for resource coordination.

Figure 5:
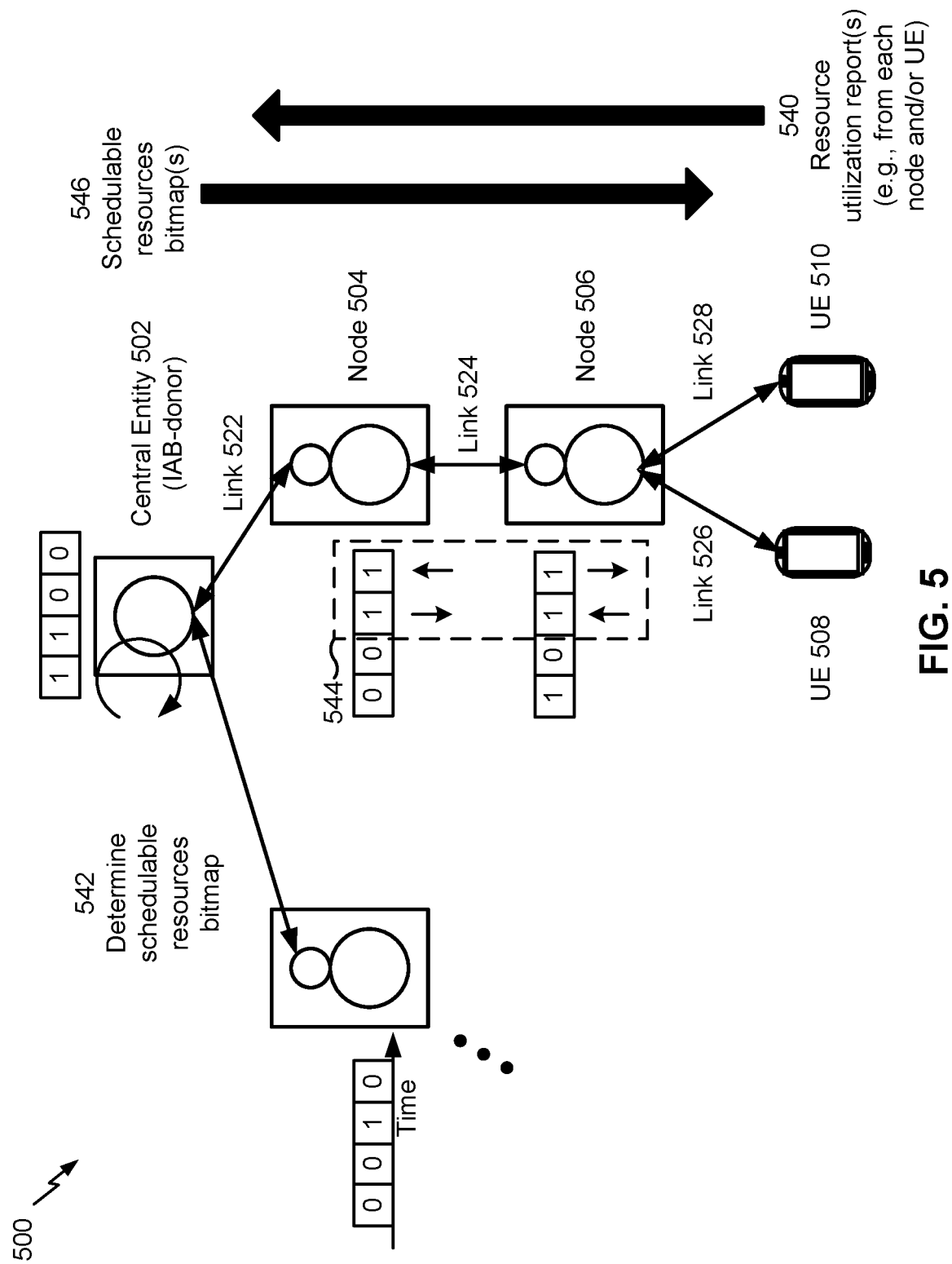
FIG. 5 is a diagram illustrating an example of centralized resource partitioning, in accordance with various aspects of the present disclosure.

FIG. 5 is a diagram illustrating an example 500 of centralized resource partitioning, in accordance with various aspects of the present disclosure. As shown in FIG. 5, example 500 includes a central entity 502 (e.g., an IAB donor), a node 504, a node 506, a UE 508, and a UE 510 in a hierarchical topology multi-link network. Central entity 502 and node 504 may communicate via a link 522; node 506 and node 504 may communicate via a link 524; UE 508 and node 506 may communicate via a link 526; and UE 510 and node 506 may communicate via a link 528.

As further shown in FIG. 5, and by reference number 540, central entity 502 may receive a resource utilization report. For example, central entity 502 may receive one or more resource utilization reports from one or more child nodes of central entity 502, such as node 504, node 506, UE 508, UE 510, and/or the like. In some aspects, a node, such as node 504, node 506, UE 508, UE 510, and/or the like may determine a resource utilization, and may provide the resource utilization report to enable central entity 502 to determine a schedulable resources bitmap. For example, node 504 may receive a first schedulable resources bitmap from central entity 502, may use one or more schedulable resources in the multi-link network, and may provide a resource utilization report indicating a utilization of the schedulable resources identified by the first schedulable resources bitmap. In this case, central entity 502 may determine a second schedulable resources bitmap for node 504 based at least in part on the resource utilization report (e.g., and one or more other resource utilization reports from one or more other child nodes of central entity 502), thereby enabling centralized dynamic reconfiguration of scheduling for the multi-link network.

As further shown in FIG. 5, and by and by reference number 542, central entity 502 may determine a schedulable resources bitmap. For example, central entity 502 may determine one or more schedulable resources bitmaps for node 504, node 506, UE 508, UE 510, and/or the like. In some aspects, central entity 502 may determine the schedulable resources bitmap based at least in part on a resource utilization report received from, and propagated upstream by node 504, node 506, UE 508, UE 510, and/or the like.

In some aspects, central entity 502 may determine the schedulable resources bitmap based at least in part on a policy in the multi-link network. For example, for nodes with a direct connection (e.g., nodes 504 and 506 via link 524), central entity 502 may determine a first schedulable resources bitmap for node 504 and a second schedulable resources bitmap for node 506. In this case, the first schedulable resources bitmap and the second schedulable resources bitmap may be determined such that schedulable resources indicated to nodes 504 and 506 are non-overlapping in time. In other words, a first set of schedulable resources indicated to node 504 does not overlap in time with a second set of schedulable resources indicated to node 506 via respective schedulable resources bitmaps. In this way, a half-duplexing policy may be enforced for the multi-link network.

Additionally, or alternatively, as shown by reference number 544, central entity 502 may determine a first schedulable resources bitmap and a second schedulable resources bitmap for node 504 and node 506, respectively, such that schedulable resources indicated to nodes 504 and 506 are overlapping in time, but are associated with a coordinated semi-static slot format configuration. In this case, the respective schedulable resource bitmaps are such that node 504 is receiving from both central entity 502 and node 506 in a third slot and is transmitting to both central entity 502 and node 506 in a fourth slot. In this way, central entity 502 may enforce a half-duplexing policy for the multi-link network.

In some aspects, central entity 502 may determine the schedulable resources bitmap based at least in part on a particular scheduling granularity. For example, central entity 502 may determine the schedulable resources bitmap to indicate a scheduling for one or more slots (e.g., a single slot or a slot group), which may reduce signaling overhead relative to scheduling on a per symbol or per symbol group basis, thereby improving network utilization. Additionally, or alternatively, central entity 502 may determine the schedulable resources bitmap to indicate scheduling for one or symbols (e.g., a single symbol or a symbol group), which may enable greater flexibility in scheduling patterns relative to scheduling on a per slot or per slot group basis, thereby improving latency. In some aspects, central entity 502 may determine a parameter of a schedulable resources bitmap (e.g., a particular bit indicator) based at least in part on a channel type. For example, central entity 502 may determine a first schedulable resources bitmap parameter for resources for a physical downlink control channel (PDDCH), a second schedulable resources bitmap parameter for resources for a physical uplink control channel (PUCCH), and/or the like.

In some aspects, central entity 502 may determine the schedulable resources bitmap and/or one or more parameters thereof based at least in part on a radio resource control (RRC) configuration of one or more other nodes, such as node 504, node 506, UE 508, UE 510, and/or the like. In some aspects, central entity 502 may determine the schedulable resources bitmap based at least in part on a resource allocation. For example, central entity 502 may determine the schedulable resources bitmap to apply to all allocated resources. In this case, one or more allocated resources, which correspond to a non-schedulable resource associated with the schedulable resources bitmap, are invalid.

Additionally, or alternatively, central entity 502 may determine the schedulable resources bitmap based at least in part on a channel type or resource allocation type. For example, central entity 502 may determine that some allocated resources, such as synchronization signal block (SSB) resources, type-0 PDCCH resources, PRACH resources, and/or the like are classified as always schedulable resources, and may determine the schedulable resources bitmap to indicate for allocated resources that are not classified as always schedulable resources. In this case, node 504 may apply the schedulable resources bitmap to a portion of a resource allocation that is not classified as always schedulable resources. In some aspects, central entity 502 may dynamically indicate a policy for resolving a conflict between a schedulable resources bitmap and a resource allocation associated with, for example, a particular type of channel.

In some aspects, central entity 502 may determine an attribute parameter for the schedulable resources bitmap. For example, central entity 502 may determine an attribute parameter for a first schedulable resources bitmap indicating that the first schedulable resources bitmap applies for an access link of node 506, and may determine an attribute parameter for a second schedulable resources bitmap indicating that the second schedulable resources bitmap applies for a backhaul link of node 506. In this way, central entity 502 may determine schedulable resources bitmaps for nodes associated with a plurality of links.

Similarly, the central entity 502 may configure an attribute parameter indicating that a particular schedulable resources bitmap applies to all links of node 506, all access links of node 506, a subset of access links of node 506, all backhaul links of node 506, a subset of backhaul links of node 506, and/or the like. Additionally, or alternatively, central entity 502 may determine an attribute parameter identifying an allocation granularity (e.g., whether the schedulable resources bitmap applies on a per slot basis, a per symbol basis, and/or the like), a time parameter (e.g., whether the schedulable resources bitmap applies to a particular time segment, to a particular scheduling type, such as FDM, and/or the like), a channel type parameter (e.g., whether the schedulable resources bitmap applies to an SSB, a PDCCH, a PDSCH, a physical uplink shared channel (PUSCH), a PRACH, and/or the like), a traffic type parameter (e.g., whether the schedulable resources bitmap applies to enhanced mobile broadband (eMBB) traffic, ultra-reliable low latency communications (URLLC) traffic, and/or the like), and/or the like.

As further shown in FIG. 5, and by reference number 546, central entity 502 may provide the schedulable resources bitmap. For example, central entity 502 may provide the schedulable resources bitmap to node 504. In some aspects, central entity 502 may provide a plurality of schedulable resources bitmaps. For example, central entity 502 may provide a first schedulable resources bitmap to node 504, a second schedulable resources bitmap to node 506, and/or the like. In this way, central entity 502 may schedule communications on the multi-link network such that a policy, such as a half-duplexing constraint, is satisfied.

In some aspects, central entity 502 may provide the schedulable resources bitmap via a particular interface. For example, central entity 502 may provide a first schedulable resources bitmap to node 504 via an F1 application protocol (F1-AP) interface, and may provide a second schedulable resources bitmap to node 506 via an F1-AP interface. Similarly, central entity 502 may receive the resource utilization report from, for example, node 504 and/or node 506 via respective F1-AP interfaces. In some aspects, a set of interaction rules for the schedulable resources bitmap and a resource allocation may be stored in a data structure (e.g., of central entity 502, node 504, node 506, and/or the like, and may be signaled using an F1-AP interface. Additionally, or alternatively, the set of interaction rules for interpreting the schedulable resources bitmap may be dynamically indicated based at least in part on a selection of one or more interaction rules of a set of candidate interaction rules.

In some aspects, the set of interaction rules may specify that the schedulable resource bitmap is applicable for all resource allocations, and any allocated resources that are associated with non-schedulable resources are invalid. Additionally, or alternatively, the set of interaction rules may establish that a resource allocation associated with a synchronization signal block (SSB), a type-0 physical downlink control channel (PDCCH), a physical random access channel (PRACH), and/or the like are to be considered schedulable resources, and the schedulable resources bitmap is only applicable to a remaining resource allocation. Additionally, or alternatively, the set of interaction rules may establish that a mobile terminal (MT) of a node (e.g., node 504, node 506, and/or the like) is to cancel an operation that conflicts with an operation of a co-located distributed unit (DU) of the node at the DU's schedulable resources.

In some aspects, an interaction rule may define that time resources with channel allocations that have a threshold performance impact (e.g., an SSB, a type-0 PDCCH, a PRACH, etc.) are always schedulable. In some aspects, an interaction rule may define that resources are to be interpretable as schedulable resources for a particular type of link. For example, in a synchronous network, resources of an SSB or type-0 PDCCH allocation may be schedulable for an access type of link. In some aspects, a schedulable pattern for the schedulable resource bitmap may be constrained based at least in part on a potential conflict with a resource allocation. In some aspects, a central unit (CU) (e.g., central entity 502) and a node (e.g., node 504, node 506, etc.) may allocate resources based at least in part on a schedulable pattern.

In some aspects, a CU (e.g., central entity 502), an MT (e.g., node 504, node 506, etc.), a DU (e.g., node 504, node 506, etc.) may resolve a particular conflict between a schedulable resource bitmap and a resource allocation. For example, when a radio-resource control (RRC)-configured allocation (e.g., a periodic or semi-persistent allocation) with allocated resources overlapping with non-schedulable resources is signaled, a DU may cancel transmission or reception at non-schedulable resources based at least in part on the schedulable resources bitmap. Similarly, child nodes of the DU may refrain from transmission or reception at non-schedulable resources without having signaled a schedulable resource bitmap at an NR Uu interface.

In some aspects, based at least in part on receiving the schedulable resources bitmap, a node, such as node 504 or node 506, may configure layer 2 (L2) scheduling. For example, node 506 may determine L2 scheduling for link 526 with UE 508 based at least in part on the schedulable resources bitmap to satisfy a policy of the multi-link network, such as a half-duplexing policy. In this way, central entity 502 may perform centralized resource partitioning for a multi-link network.

As indicated above, FIG. 5 is provided as an example. Other examples may differ from what is described with regard to FIG. 5.

Figure 6:
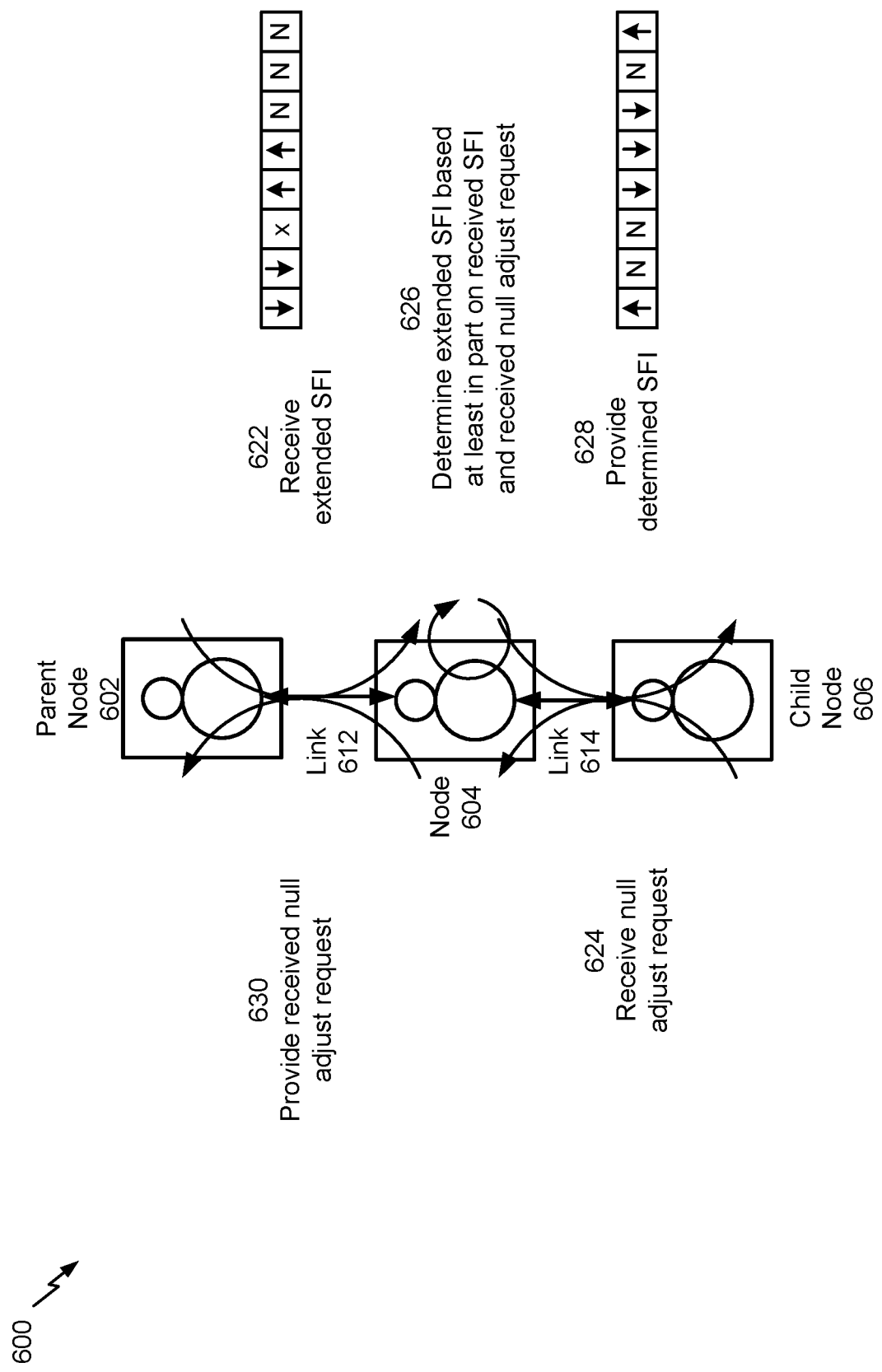
FIG. 6 is a diagram illustrating an example of dynamic resource coordination, in accordance with various aspects of the present disclosure.

FIG. 6 is a diagram illustrating an example 600 of dynamic resource coordination, in accordance with various aspects of the present disclosure. As shown in FIG. 6, example 600 includes a parent node 602, a node 604, and a child node 606 communicating in a multi-link network. In some aspects, parent node 602 and node 604 may communicate via link 612, and node 604 and child node 606 may communicate via link 614.

As further shown in FIG. 6, and by reference number 622, node 604 may receive an extended SFI from parent node 602. For example, node 604 may receive the extended SFI from parent node 602 via link 612. In some aspects, the extended SFI may include a null field. For example, parent node 602 may set a null (N) value for a field to dynamically indicate non-schedulable resources to node 604 (e.g., a child node of parent node 602). In some aspects, the null value may be applicable for a particular type of resource. For example, parent node 602 may not set the null value for a resource that is allocated for a synchronization signal block (SSB), a physical random access channel (PRACH), a physical downlink control channel (PDDCH) type-0, and/or the like.

In some aspects, the extended SFI may include one or more other values, such as a downlink (↓) value, an uplink value (↑), a flexible (x) value (e.g., that may be flexibly used for downlink or uplink), and/or the like. In this way, parent node 602 may indicate scheduling to node 604. In some aspects, node 604 may receive the extended SFI based at least in part on dynamic coordination being configured for the network. For example, a first node (e.g., node 604) may transmit a dynamic coordination flag to a second node (e.g., parent node 602) to indicate that dynamic coordination is to be enabled based at least in part on a capability of the first node and/or the second node.

As further shown in FIG. 6, and by reference number 624, node 604 may receive a null adjust request from child node 606. For example, node 604 may receive the null adjust request from child node 606 via link 614. In some aspects, the null adjust request may include a value indicating a change to a null field of an extended SFI message. For example, child node 606 may indicate an increase to a quantity of null fields or a reduction to a quantity of null fields. Additionally, or alternatively, child node 606 may indicate that no change is to be applied to the null fields. In some aspects, node 604 may receive the null adjust request via a physical uplink control channel (PUCCH) message, a media access control (MAC) control element (CE) message, and/or the like.

As further shown in FIG. 6, and by reference number 626, node 604 may determine an extended SFI based at least in part on the received SFI and the received null adjust request. For example, node 604 may determine the extended SFI based at least in part on values of the received extended SFI from parent node 602 and a value for the received null adjust request from child node 606. In this way, node 604 uses the extended SFI and the null adjust request to dynamically coordinate communication in a multi-link network. In some aspects, node 604 may determine the extended SFI to enforce one or more policies for the multi-link network. For example, node 604 may determine the extended SFI to cause a scheduling for link 614 and link 612 to satisfy a half-duplexing policy.

As further shown in FIG. 6, and by reference number 628, node 604 may provide the determined extended SFI to child node 606. For example, node 604 may provide the determined extended SFI to child node 606 (and/or to one or more other child nodes). In some aspects, node 604 may provide the determined extended SFI to child node 606 to indicate to child node 606 a schedule for a monitoring occasion (e.g., a set of 20 slots of a channel associated with link 614).

In some aspects, the determined extended SFI may be associated with a particular delay corresponding to a PDCCH decoding capability of, for example, node 604. For example, node 604 may be associated with a particular delay in decoding a PDCCH conveying the received extended SFI. In this case, a communication schedule may account for the particular delay by including one or more repeated slots. For example, for a one slot per hop delay in a multi-link network with a set of 4 hierarchical nodes, a first monitoring occasion at a first node may be associated with 4 repeated slots, a second monitoring occasion at a second node may be associated with 3 repeated slots, a third monitoring occasion at a third node may be associated with 2 repeated slots, and a fourth monitoring occasion at a fourth node may be associated with 1 repeated slot. In this way, each node (e.g., parent node 602, node 604, child node 606, and/or the like) may determine a slot format for a monitoring occasion based at least in part on an extended SFI.

As further shown in FIG. 6, and by reference number 630, node 604 may provide the received null adjust request to parent node 602. For example, node 604 may propagate the received null adjust request to parent node 602 to enable parent node 602 to adjust a schedule of a next extended SFI that is to be provided to node 604 to schedule link 612 for parent node 602 and node 604. In this way, node 604 enables uplink feedback for dynamic coordination in a multi-link network.

As indicated above, FIG. 6 is provided as an example. Other examples may differ from what is described with regard to FIG. 6.

Figure 7:
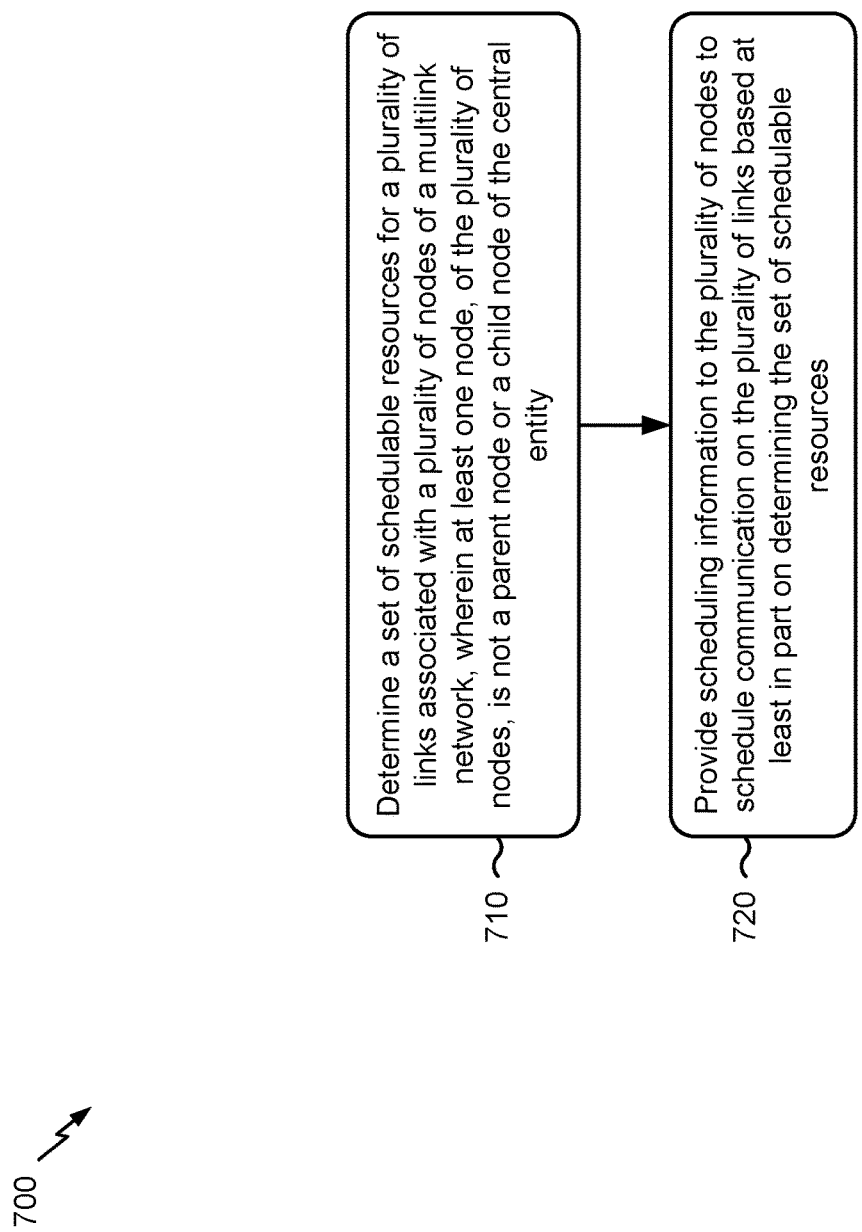
FIG. 7 is a diagram illustrating an example process performed, for example, by a central entity, in accordance with various aspects of the present disclosure.

FIG. 7 is a diagram illustrating an example process 700 performed, for example, by a central entity, in accordance with various aspects of the present disclosure. Example process 700 is an example where a central entity (e.g., BS 110, UE 120, central entity 502, and/or the like) performs centralized resource partitioning.

As shown in FIG. 7, in some aspects, process 700 may include determining a set of schedulable resources for a plurality of links associated with a plurality of nodes of a multi-link network, wherein at least one node, of the plurality of nodes, is not a parent node or a child node of the central entity (block 710). For example, the central entity (e.g., using controller/processor 240, controller/processor 280, and/or the like) may determine a set of schedulable resources for a plurality of links associated with a plurality of nodes of a multi-link network, wherein at least one node, of the plurality of nodes, is not a parent node or a child node of the central entity, as described in more detail above with reference to FIGS. 4A, 4B, 4C, 5, and/or 6.

As shown in FIG. 7, in some aspects, process 700 may include providing scheduling information to the plurality of nodes to schedule communication on the plurality of links based at least in part on determining the set of schedulable resources (block 720). For example, the central entity (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may provide scheduling information to the plurality of nodes to schedule communication on the plurality of links based at least in part on determining the set of schedulable resources, as described in more detail above with reference to FIGS. 4A, 4B, 4C, 5, and/or 6.

Process 700 may include additional aspects, such as any single aspect or any combination of aspects described below and/or in connection with one or more other processes described elsewhere herein.

In a first aspect, the central entity is configured to determine the set of schedulable resources based at least in part on a resource utilization report received from another one of the plurality of nodes. In a second aspect, alone or in combination with the first aspect, the scheduling information is a schedulable resource bitmap, wherein bits of the schedulable resource bitmap indicate whether corresponding resource units are schedulable by a particular node of the plurality of nodes. In a third aspect, alone or in combination with any one of the first and second aspects, a message received by the central entity to identify the set of schedulable resources or a message conveying the scheduling information is an F1 Application Protocol (F1-AP) message. In a fourth aspect, alone or in combination with any one of the first through third aspects, a first subset of the set of schedulable resources is associated with a first direction in the network and a second subset of the set of schedulable resources is associated with a second direction in the network. In a fifth aspect, alone or in combination with any one of the first through fourth aspects, the first subset and the second subset are non-overlapping in a time domain.

In a sixth aspect, alone or in combination with any one of the first through fifth aspects, the first subset and the second subset are overlapping in time and associated with a coordinated semi-static slot format configuration. In a seventh aspect, alone or in combination with any one of the first through sixth aspects, the central entity is configured to schedule communication on at least one of: a per slot basis, a per slot group basis, a per symbol basis, or a per symbol group basis. In an eighth aspect, alone or in combination with any one of the first through seventh aspects, the central entity is configured to determine the scheduling information based at least in part on at least one of radio resource configuration of the plurality of nodes.

In a ninth aspect, alone or in combination with any one of the first through eighth aspects, the central entity is configured to receive a resource utilization report identifying a utilization of one or more schedulable resources, and the resource utilization report is determined based at least in part on layer 2 (L2) scheduling. In a tenth aspect, alone or in combination with any one of the first through ninth aspects, the set of scheduling resources are determined based at least in part on at least one of: a time resource, a channel allocation, a link type, a scheduling pattern capability parameter, a resource availability, an allocation type, or an aggregation parameter. In an eleventh aspect, alone or in combination with any one of the first through tenth aspects, the scheduling information is associated with an attribute parameter, and the attribute parameter identifies at least one of: an allocation granularity, a link association, a time segment, a channel type, or a traffic type.

In a twelfth aspect, alone or in combination with any one of the first through eleventh aspects, the scheduling information is associated with one or more links of the plurality of links, and the one or more links include at least one of: the plurality of links, a subset of the plurality of links, a set of access links of the plurality of links, a set of backhaul links of the plurality of links. In a thirteenth aspect, alone or in combination with any one of the first through twelfth aspects, the scheduling information is associated with a channel type, and the channel type includes at least one of: a synchronization signal block channel, a physical downlink control channel, a physical downlink shared channel, or a physical uplink shared channel. In a fourteenth aspect, alone or in combination with any one of the first through thirteenth aspects, the scheduling information is configured for a particular channel type based at least in part on explicit configuration information included in the scheduling information or implicit configuration information associated with a radio resource configuration message.

In a fifteenth aspect, alone or in combination with any one of the first through fourteenth aspects, the central entity is configured to comply with one or more interaction rules for the set of schedulable resources. In a sixteenth aspect, alone or in combination with any one of the first through fifteenth aspects, the one or more interaction rules define the set of schedulable resources as applicable for an entirety of a resource allocation. In a seventeenth aspect, alone or in combination with any one of the first through sixteenth aspects, the one or more interaction rules define a particular type of channel as a schedulable resource, and the particular type of channel includes at least one of: a synchronization signal block, a type-0 physical downlink control channel, or a physical random access channel.

In an eighteenth aspect, alone or in combination with any one of the first through seventeenth aspects, the one or more interaction rules define a particular type of link. In a nineteenth aspect, alone or in combination with any one of the first through eighteenth aspects, providing the scheduling information includes causing a first node, of the plurality of nodes, to cancel an operation that conflicts with an operation of a second node, of the plurality of nodes, in accordance with the one or more interaction rules. In a twentieth aspect, alone or in combination with any one of the first through nineteenth aspects, a first subset of the set of schedulable resources is associated with a first scheduling node, of the plurality of nodes, and a second subset of the set of schedulable resources is associated with a second scheduling node of the plurality of nodes, and the first scheduling node is directly connected to the second scheduling node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
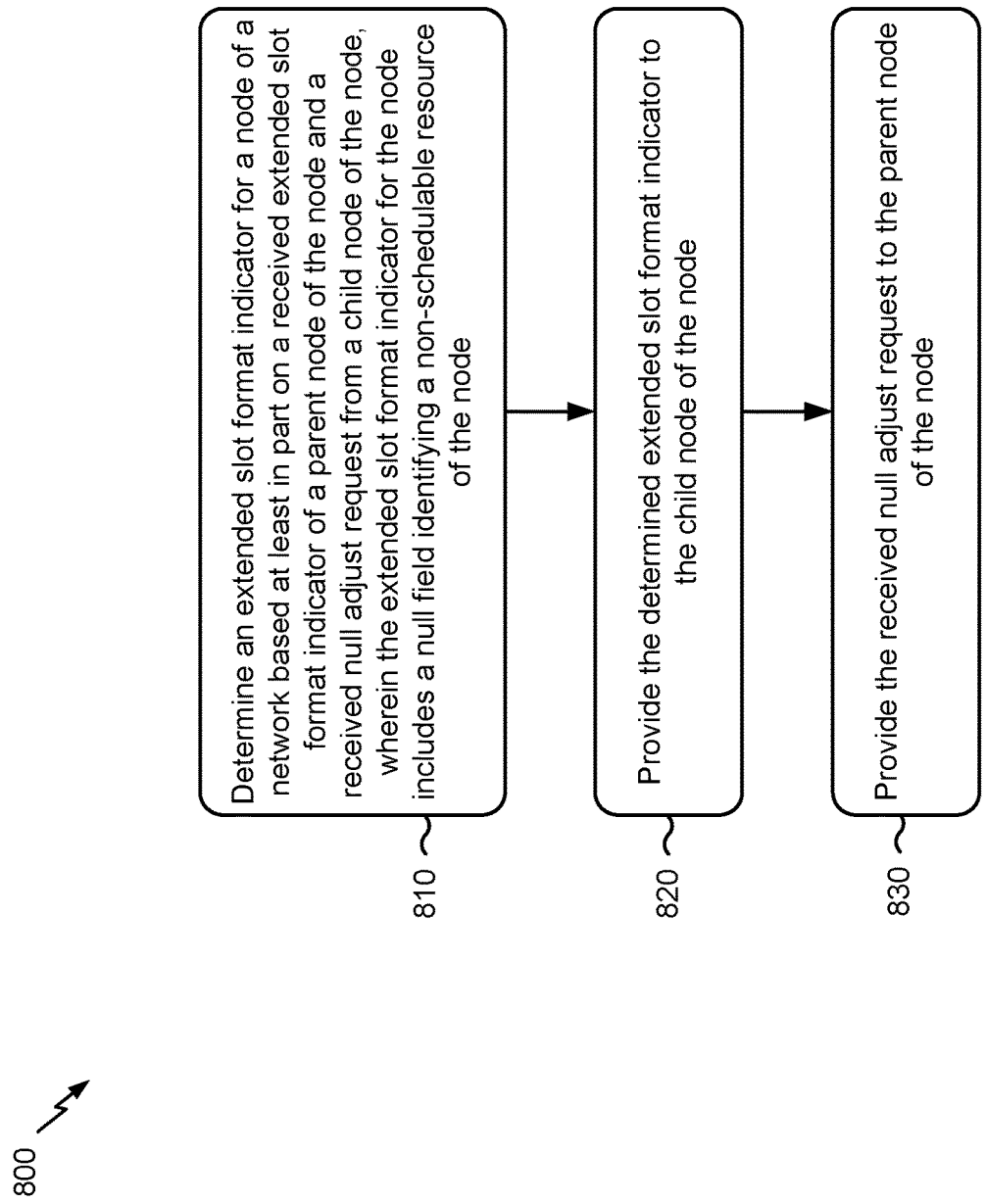
FIG. 8 is a diagram illustrating an example process performed, for example, by a node, in accordance with various aspects of the present disclosure.

FIG. 8 is a diagram illustrating an example process 800 performed, for example, by a node, in accordance with various aspects of the present disclosure. Example process 800 is an example where a node (e.g., BS 110, UE 120, node 604, and/or the like) of a network performs dynamic resource coordination.

As shown in FIG. 8, in some aspects, process 800 may include determining an extended slot format indicator for the node based at least in part on a received extended slot format indicator of a parent node of the node and a received null adjust request from a child node of the node, wherein the extended slot format indicator for the node includes a null field identifying a non-schedulable resource of the node (block 810). For example, the node (e.g., using controller/processor 240, controller/processor 280, and/or the like) may determine an extended slot format indicator for the node based at least in part on a received extended slot format indicator of a parent node of the node and a received null adjust request from a child node of the node, wherein the extended slot format indicator for the node includes a null field identifying a non-schedulable resource of the node, as described in more detail above with reference to FIGS. 4A, 4B, 4C, 5, and/or 6.

As shown in FIG. 8, in some aspects, process 800 may include providing the determined extended slot format indicator to the child node of the node (block 820). For example, the node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may provide the determined extended slot format indicator to the child node of the node, as described in more detail above with reference to FIGS. 4A, 4B, 4C, 5, and/or 6.

As shown in FIG. 8, in some aspects, process 800 may include providing the received null adjust request to the parent node of the node (block 830). For example, the node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may provide the received null adjust request to the parent node of the node, as described in more detail above with reference to FIGS. 4A, 4B, 4C, 5, and/or 6.

Process 800 may include additional aspects, such as any single aspect or any combination of aspects described below and/or in connection with one or more other processes described elsewhere herein.

In a first aspect, the node is configured to receive the received null adjust request message in a physical uplink control channel or a media access control (MAC) control element (CE). In a second aspect, alone or in combination with the first aspect, a quantity of repeated slots in the extended slot format indicator for the node relative to the received extended slot format indicator of the parent node corresponds to a physical downlink control channel decoding capability and a physical downlink channel monitoring occasion schedule.

In a third aspect, alone or in combination with any one or more of the first and second aspects, the node is configured to use the extended slot format indicator based at least in part on a value for a dynamic coordination flag. In a fourth aspect, alone or in combination with any one or more of the first through third aspects, the node is configured to define one or more slots as null slots and one or more symbols as null symbols. In a fifth aspect, alone or in combination with any one or more of the first through fourth aspects, the null slots are not resources allocated for at least one of: a synchronization signal block, a physical random access channel, or a type-0 physical downlink control channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

n The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a node of a network, comprising:
   receiving, from a parent node of the node, an extended slot format indicator (SFI) providing a dynamic indication of whether a set of resources are schedulable or non-schedulable; and
   scheduling, based at least in part on the dynamic indication, one or more resources, of the set of resources, for a link between the node and a child node of the node.

2. The method of claim 1, wherein the extended SFI is based at least in part on a radio-resource control (RRC) configuration.

3. The method of claim 1, wherein the scheduled one or more resources is on at least one of a per slot basis, a per slot group basis, a per symbol basis, or aper symbol group basis.

4. The method of claim 1, wherein scheduling the one or more resources comprises:
   scheduling the one or more resources, of the set of resources, per a set of slots of a channel associated with the link between the node and the child node.

5. The method of claim 1, further comprising:
   providing the scheduled one or more resources to the child node.

6. The method of claim 5, further comprising:
   defining one or more slots, as null slots, and one or more symbols as null symbols,
      wherein the extended slot format indicator comprises the one or more slots and the one or more symbols, and
      wherein providing the scheduled one or more resources or the child node is based at least in part on defining the one or more slots and the one or more symbols.

7. The method of claim 6, wherein the null slots are not resources allocated for at least one of a synchronization signal block, a physical random access channel, or a type-0 physical downlink control channel.

8. The method of claim 1, further comprising:
   providing the scheduled one or more resources to another node that is another child node of the parent node.

9. The method of claim 8, wherein receiving the extended SFI comprises:
   receiving the extended SFI via a first interface; and
   wherein providing the scheduled one or more resources comprises:
      providing the scheduled one or more resources to the node via a second interface different from the first interface.

10. The method of claim 1, wherein scheduling the one or more resources comprises:
    scheduling, based at least in part on a value for a dynamic coordination flag associated with the dynamic indication, the one or more resources, of the set of resources, for the link between the node and the child node of the node.

11. The method of claim 1, wherein the child node is a user equipment.

12. A node for wireless communication, comprising:
    a memory; and
    one or more processors, coupled to the memory, configured to:
       receive, from a parent node of the node, an extended slot format indicator (SFI) providing a dynamic indication of whether a set of resources are schedulable or non-schedulable; and
       schedule, based at least in part on the dynamic indication, one or more resources, of the set of resources, for a link between the node and a child node of the node.

13. The node of claim 12, wherein the extended SFI is based at least in part on a radio-resource control (RRC) configuration.

14. The node of claim 12, wherein the scheduled one or more resources is on at least one of a per slot basis, a per slot group basis, a per symbol basis, or a per symbol group basis.

15. The node of claim 12, wherein the one or more processors, to schedule the one or more resources, are configured to:
    schedule the one or more resources, of the set of resources, per a set of slots of a channel associated with the link between the node and the child node.

16. The node of claim 12, wherein the one or more processors are further configured to:
    provide the scheduled one or more resources to the child node.

17. The node of claim 16, wherein the one or more processors are further configured to:
    define one or more slots, as null slots, and one or more symbols as null symbols,
       wherein the extended slot format indicator comprises the one or more slots and the one or more symbols, and
       wherein providing the scheduled one or more resources or the child node is based at least in part on defining the one or more slots and the one or more symbols.

18. The node of claim 17, wherein the null slots are not resources allocated for at least one of a synchronization signal block, a physical random access channel, or a type-0 physical downlink control channel.

19. The node of claim 12, wherein the one or more processors are further configured to:
    provide the scheduled one or more resources to another node that is another child node of the parent node.

20. The node of claim 19, wherein the one or more processors, to receive the extended SFI, are configured to:
    receive the extended SFI via a first interface; and wherein the one or more processors, to provide the scheduled one or more resources, are configured to:
       provide the scheduled one or more resources to the node via a second interface different from the first interface.

21. The node of claim 12, wherein the one or more processors, to schedule the one or more resources, are configured to:
    schedule, based at least in part on a value for a dynamic coordination flag associated with the dynamic indication, the one or more resources, of the set of resources, for the link between the node and the child node of the node.

22. The node of claim 12, wherein the child node is a user equipment.

23. A non-transitory computer-readable medium storing a set of instructions for wireless communication, the set of instructions comprising:
    one or more instructions that, when executed by one or more processors of a node, cause the node to:
       receive, from a parent node of the node, an extended slot format indicator (SFI) providing a dynamic indication of whether a set of resources are schedulable or non-schedulable; and schedule, based at least in part on the dynamic indication, one or more resources, of the set of resources, for a link between the node and a child node of the node.

24. The non-transitory computer-readable medium of claim 23, wherein the extended SFI is based at least in part on a radio-resource control (RRC) configuration.

25. An apparatus for wireless communication, comprising:
  means for receiving, from a parent node of a node, an extended slot format indicator (SFI) providing a dynamic indication of whether a set of resources are schedulable or non-schedulable; and
  means for scheduling, based at least in part on the dynamic indication, one or more resources, of the set of resources, for a link between the node and a child node of the node.

26. The apparatus of claim 25, wherein extended SFI is based at least in part on a radio-resource control (RRC) configuration.

27. The apparatus of claim 25, wherein the scheduled one or more resources is on at least one of a per slot basis, a per slot group basis, a per symbol basis, or aper symbol group basis.

28. The apparatus of claim 25, wherein the means for scheduling the one or more resources comprises:
  means for scheduling the one or more resources, of the set of resources, per a set of slots of a channel associated with the link between the node and the child node.

29. The apparatus of claim 25, further comprising:
  means for providing the scheduled one or more resources to the child node.

* * * * *